United States Patent
Eschbach

(10) Patent No.: US 8,211,490 B2
(45) Date of Patent: Jul. 3, 2012

(54) DOUBLE LAYER UV VARIABLE DATA TEXT

(75) Inventor: Reiner Eschbach, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 603 days.

(21) Appl. No.: 12/405,621

(22) Filed: Mar. 17, 2009

(65) Prior Publication Data

US 2010/0239831 A1 Sep. 23, 2010

(51) Int. Cl.
*B41M 3/14* (2006.01)
*B44F 1/12* (2006.01)
*G03F 1/00* (2006.01)
*B41F 17/00* (2006.01)

(52) U.S. Cl. ................... 427/7; 430/5; 101/35
(58) Field of Classification Search .......... 427/7; 430/5; 101/35
See application file for complete search history.

(56) References Cited

U.S. PATENT DOCUMENTS

| | | | |
|---|---|---|---|
| 5,271,645 A | 12/1993 | Wicker | |
| 2007/0262579 A1 | 11/2007 | Bala et al. | |
| 2007/0264476 A1* | 11/2007 | Bala et al. | 428/195.1 |
| 2008/0199785 A1 | 8/2008 | Bala et al. | |
| 2008/0252066 A1* | 10/2008 | Rapoport et al. | 283/94 |

FOREIGN PATENT DOCUMENTS

| | | |
|---|---|---|
| EP | 1 961 577 | 8/2008 |
| EP | 2 166 047 | 3/2010 |

OTHER PUBLICATIONS

European Search Report mailed Feb. 21, 2012 for European Application No. 10156647.9.

* cited by examiner

*Primary Examiner* — Kelly M Gambetta
(74) *Attorney, Agent, or Firm* — Fay Sharpe LLP

(57) ABSTRACT

A method and system are provided for including a double layer security mark in digital document data defining an image of a document to be printed and in the printed document, itself. A fluorescence mark region including a fluorescence mark is defined using first and second metameric colorant mixtures. Variation in colorant spatial coverage between the first and second metameric colorant mixtures results in colorant-free areas that define the fluorescence mark due to substrate fluorescence under UV illumination. The fluorescence mark region is modified to define a double layer fluorescence mark region including the fluorescence mark and also including at least one visible light object defined by a third colorant mixture. The third colorant mixture is added to the fluorescence mark region by masking the colorant-free areas of the fluorescence mark region to prevent writing of the third colorant mixture data to the colorant-free areas so as not to disturb the colorant-free areas.

8 Claims, 9 Drawing Sheets

DOUBLE LAYER UV VARIABLE DATA TEXT

BACKGROUND

Security is an important concern in the realm of documents and digital production and/or reproduction of same. Known digital image printing/copying systems produce documents of such high quality that a need has been identified to prevent effective printing/copying of certain documents such as high-value printed items including tickets, financial instruments, security passes, and the like. Known techniques include printing the original document in a manner such that it includes a digital "watermark" using only conventional paper and toner or ink. A digital watermark in a broad sense can be defined as information, for example one or more letters, words, symbols or patterns, that is at least partially (preferably fully or at least substantially) hidden in a printed image under normal viewing conditions but that is more clearly discernable under certain specialized viewing conditions. Unauthorized reproduction of documents including such digital watermarks typically degrades or obscures the digital watermark, which can aid in detection of counterfeit documents.

A fluorescence mark is one example of a known digital watermark. Methods and systems are known for including fluorescence marks in printed documents using conventional papers (e.g., ordinary "copy paper" or "printer paper") and ordinary inks/toners (e.g., CMYK ink/toner), specifically by using metameric colorant mixtures. Under visible lighting conditions [e.g., electromagnetic radiation wavelengths of about 400-700 nanometers (nm)], the different colorant mixtures that are printed on respective adjacent portions of the paper together define an overall printed document region that appears substantially uniform in color. Under ultraviolet (UV) lighting (e.g., electromagnetic radiation wavelengths shorter than about 400 nm), these different colorant mixtures exhibit different UV absorption and, thus, different suppression of UV fluorescence of the optical brightening agents used in conventional printing/copying papers such that the region printed with the colorant mixture that suppresses less of the substrate fluorescence appears as a lighter/brighter region while the adjacent area printed with the colorant mixture that strongly suppresses substrate fluorescence appears as a darker region. These contrast variations under UV lighting are used to create watermark-like patterns, e.g., numbers, letters, symbols, shapes.

An example of this is shown in FIG. 1, wherein a colorant mixture "B" is selected and applied to patch area BP which, in this example, is shaped as the alphanumeric symbol "0". Further, a colorant mixture "A" is selected and applied to patch area AP arranged here in substantially close spatial proximity to patch area BP, and thereby providing a background around patch area BP. The patch areas AP and BP together define a fluorescence mark region FMR. Both colorant mixture A and colorant mixture B are comprised of one or more suitably selected colorants, but colorant mixtures A and B are different mixtures. Each colorant mixture A or B may be, for example, either a single CMYK colorant or any mixture of CMYK colorants. In the illustrated example, colorant mixture A will be selected so as to provide greater substrate coverage and greater substrate fluorescence suppression as compared to colorant mixture B. The colorant mixtures A and B will also be selected to match each other closely in their average color and luminance when viewed under visible light conditions. As shown at UV in FIG. 1, under UV lighting conditions, patch BP will appear brighter as compared to patch AP, due to the relatively limited suppression of the fluorescence of the optical brightening agents in the paper substrate as compared to the patch AP, thus forming a fluorescence mark FM. In contrast, under visible light conditions as shown at VIS, patches AP,BP are at least substantially indistinguishable. This property of matching color under a first lighting condition (e.g., visible light) but unmatched color under a second lighting condition (e.g., UV light) is referred to as metamerism and the colorant mixtures A and B can be said to define a metameric or approximately metameric pair.

By way of a simplified example, an approximate 50% gray color may be realized with a halftone of black (K) colorant only and used for colorant mixture B to print patch BP. This may then be color-matched against a colorant mixture A comprising cyan (C), magenta (M), and yellow (Y) that yields a similar approximate 50% gray color, which is used to print the patch AP. In general, colorant mixture A will cover more of the paper, thus providing much higher suppression of native substrate fluorescence as compared to the patch BP, so that under UV lighting conditions, the patch BP will be readily apparent as a fluorescence mark FM. The two colorant mixtures will appear quite nearly identical "gray" under normal visible light viewing as shown at VIS in FIG. 1. Thus, when a document including such a fluorescence mark is subjected to UV illumination, the fluorescence mark FM is revealed. A printed "look-alike" document or mere photocopy will not properly reproduce the watermark.

Additional details and variations relating to fluorescence marks are disclosed in U.S. patent application Ser. No. 11/382,897 filed May 11, 2006 in the name of Raja Bala and Reiner Eschbach and entitled "Substrate Fluorescence Mask for Embedding Information in Printed Documents" and U.S. patent application Ser. No. 11/382,869 filed May 11, 2006 in the name of Raja Bala and Reiner Eschbach and entitled "Substrate Fluorescence Pattern Mask for Embedding Information in Printed Documents" and the disclosures of both these applications are hereby expressly incorporated by reference into the present specification.

The above and other known systems and methods allow the fluorescence mark FM to represent variable data, e.g., a user-selected string, symbol or pattern. Known systems and methods do not allow for "double layer variable data" wherein additional user-selected variable data is printed in the fluorescence mark region FMR for viewing in visible light, without obscuring or altering the fluorescence mark FM as viewed in UV light. It has been deemed desirable to provide a system and method according to the present development for implementing double layer variable data in a fluorescence mark region FMR, wherein the fluorescence mark region FMR includes both UV light variable data as a fluorescence mark FM and visible light variable data, without the visible light variable data obscuring or altering the fluorescence mark.

One previously considered possibility for creating the first (UV light) and second (visible light) variable data region would be to use colors C1 and C2 as a metameric pair for the fluorescence mark variable data and use color C3 for the visible light variable data if the following relationships could be preserved:

C1(visible light)≈C2(visible light)≠C3 (visible light)
C1(UV light)≠C2(UV light)≈C3 (UV light)

Such colorant combinations are not easily generated and identified. As such, an alternative method for implementing double layer variable data in a fluorescence mark region FMR is needed.

SUMMARY

In accordance with one aspect of the present development, a method is provided for including a double layer security mark in digital document data defining an image of a document to be printed. The method includes defining a fluorescence mark region including a fluorescence mark in the digital document data. The fluorescence mark region is defined by first colorant mixture data for a first color and second colorant mixture data for a second color, wherein the first and second colors are an approximate metameric pair and wherein the first colorant mixture data and the second colorant mixture data define colorant-free areas of the fluorescence mark region. The fluorescence mark region is modified to define a double layer fluorescence mark region including the fluorescence mark and also including at least one visible light object defined by third colorant mixture data. The fluorescence mark region modification includes writing the third colorant mixture data to the fluorescence mark region and masking colorant-free areas of the fluorescence mark region to prevent writing of the third colorant mixture data to the colorant-free areas.

In accordance with another aspect of the present development, a printed document includes a fluorescence mark region including first and second colorant mixtures that define a fluorescence mark in the fluorescence mark region, wherein the fluorescence mark comprises colorant-free areas in the fluorescence mark region. The fluorescence mark is visible to a human observer when the fluorescence mark region is viewed in UV light. A third colorant mixture printed in the fluorescence mark region, and the third colorant mixture defines a visible light object that is apparent to a human observer when the fluorescence mark region is viewed in visible light. The visible light object is less visible to a human observer as compared to the fluorescence mark when the fluorescence mark region is viewed in UV light, and the visible light object is more visible to a human observer as compared to the fluorescence mark when the fluorescence mark region is viewed in visible light.

In accordance with another aspect of the present development, a method is provided for writing variable data to a fluorescence mark region of a digital image defining a document to be printed. The method includes writing variable data into the fluorescence mark region while masking the fluorescence mark region to prevent variable data from being written to a colorant-free area of the fluorescence mark region.

DETAILED DESCRIPTION

Figure 1:
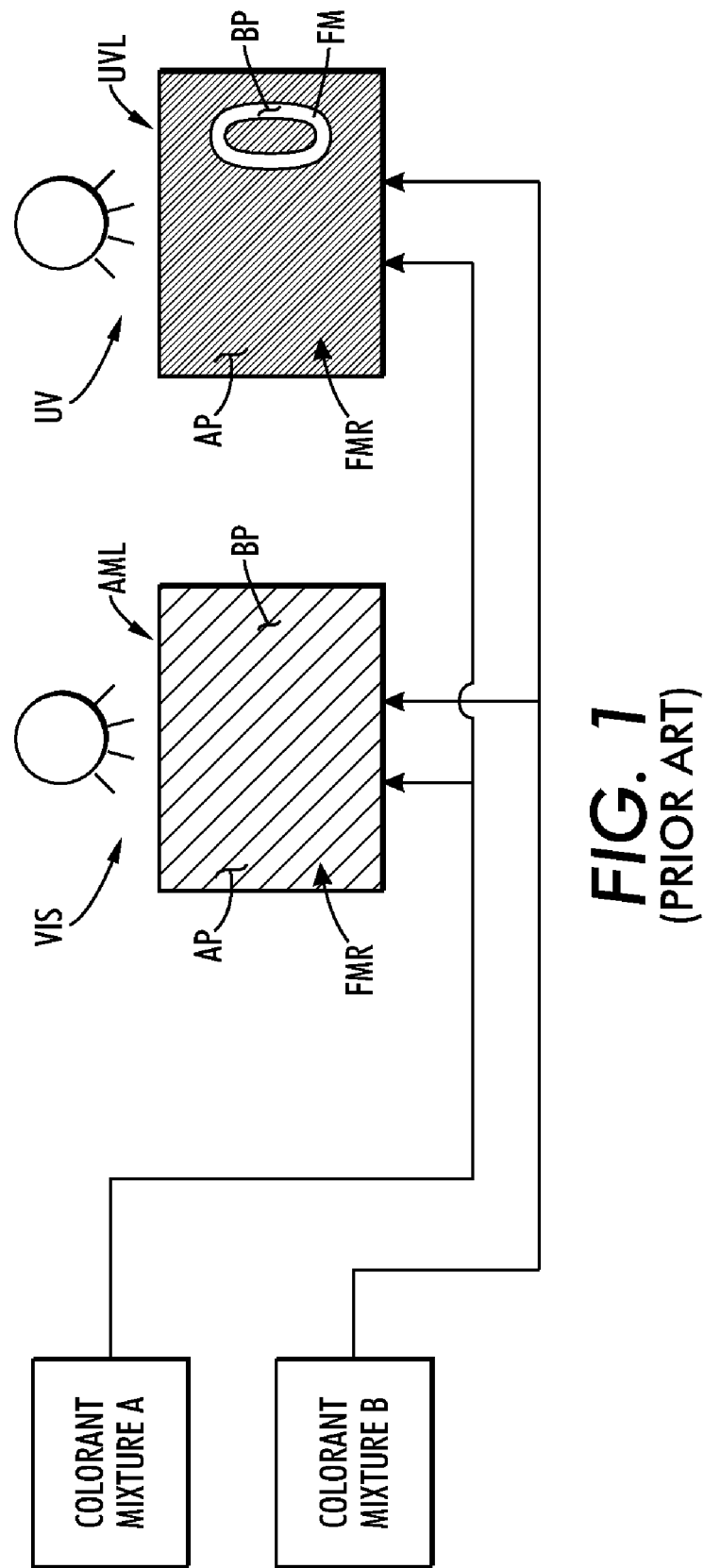
FIG. 1 (prior art) diagrammatically discloses the inclusion of a fluorescence mark in a printed document.
Figure 2:
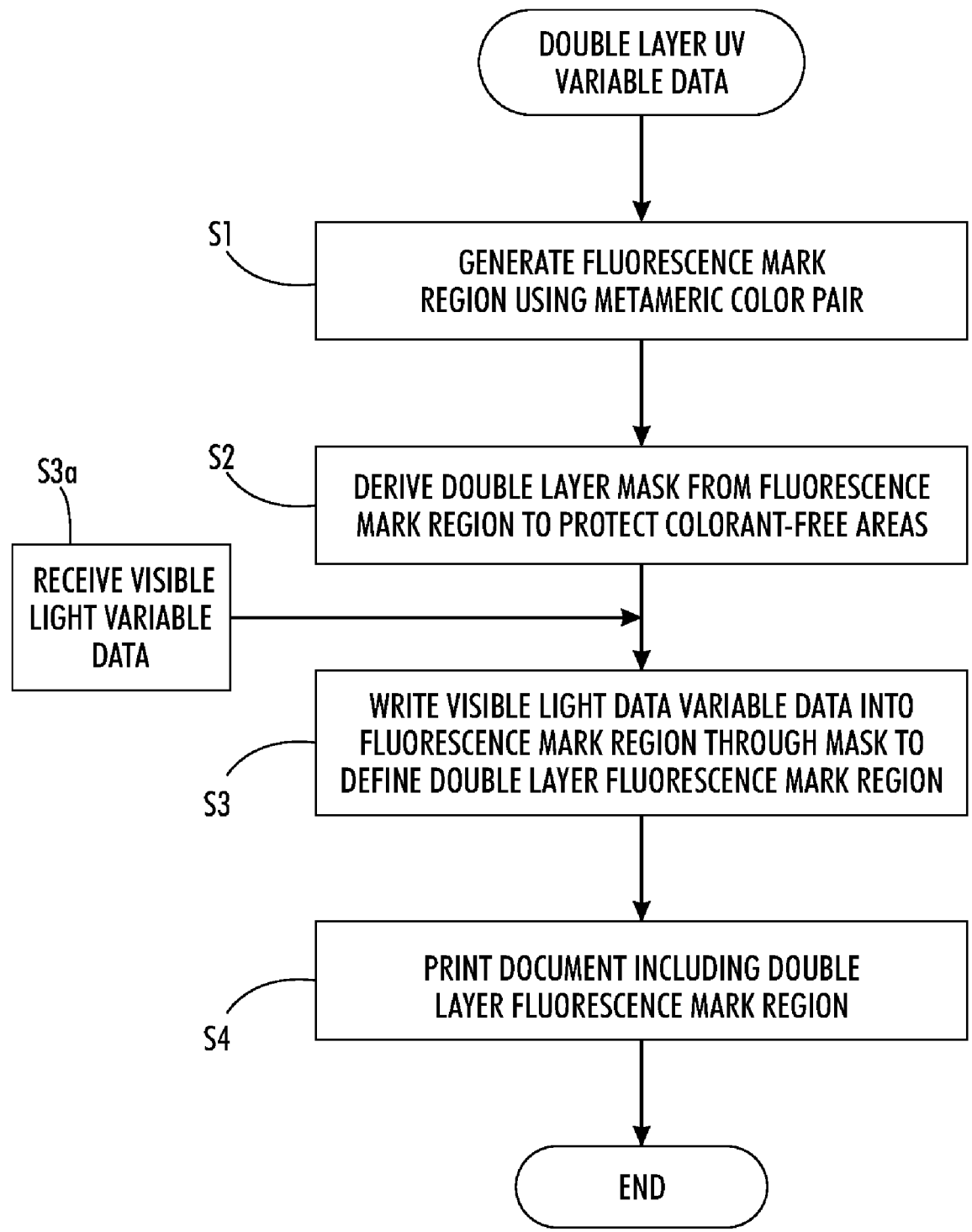
FIG. 2 is a flow chart illustrating one method for providing double layer variable data in a fluorescence mark region.

FIG. 2 is a flow chart that illustrates a double layer variable data fluorescence mark method in accordance with the present development. In a step S1, a conventional fluorescence mark region FMR is generated using data that define a metameric colorant pair using a colorant mixture A and a colorant mixture B as described above such that the fluorescence mark region FMR includes at least one fluorescence mark FM that represents any desired variable data, e.g., a character string of length one or more. The step S1 is conventional as described above and results in a conventional fluorescence mark region FMR as illustrated in FIG. 1.

Unlike conventional methods, however, the double layer variable data fluorescence mark method in accordance with the present development includes a step S2 wherein a double layer mask for the fluorescence mark region FMR is derived or loaded from a pre-derived set. The double layer mask is set to "off" for all areas of the fluorescence mark region FMR including or corresponding to a colorant free location, i.e., for all areas of the fluorescence mark region FMR that represent unprinted or colorant-free areas in the fluorescence mark region. On the other hand, the double layer mask is set to "on" for all other areas of the fluorescence mark region FMR, i.e., for all areas in the fluorescence mark region that are covered with colorant from the colorant mixture A or the colorant mixture B. As such, the double layer mask permits writing of visible light variable data to the fluorescence mark region FMR only in locations where the mask is set to "on" and blocks writing of any visible light variable data to the fluorescence mark region FMR where the mask is set to "off." Stated another way, the double layer mask blocks writing of visible light variable data in a fluorescence mark region FMR for all areas that are colorant free, because these regions must remain colorant free to define the fluorescence mark due to fluorescence of the paper or other substrate of a printed document.

The method of FIG. 2 further includes a step S3 wherein the visible light variable data are written into the fluorescence mark region FMR through the double layer mask used in step S2, so as to define a double layer variable data fluorescence mark region FMR' (see FIG. 4A) including at least one visible light object VLO (e.g., a text character, a numeric character, a symbol, etc.) defined by the visible light variable data to be perceived by a human observer when the double layer variable data fluorescence mark region FMR' is viewed in visible light. The double layer variable data fluorescence mark region FMR', further includes the fluorescence mark FM (shown as the letter "X") that is visible to a human observer when the double layer variable data fluorescence mark region FMR' is viewed in UV light. The step S3 can be prefaced by a step S3a of receiving the visible light variable data from a source such as a user input terminal or digital front end. As such, a user can vary the content of the visible light variable data to be included in the double layer variable data fluorescence mark region FMR'.

In a step S4, a document is printed on paper or another substrate so as to include the double layer variable data fluorescence mark region FMR'.

Figure 2A:
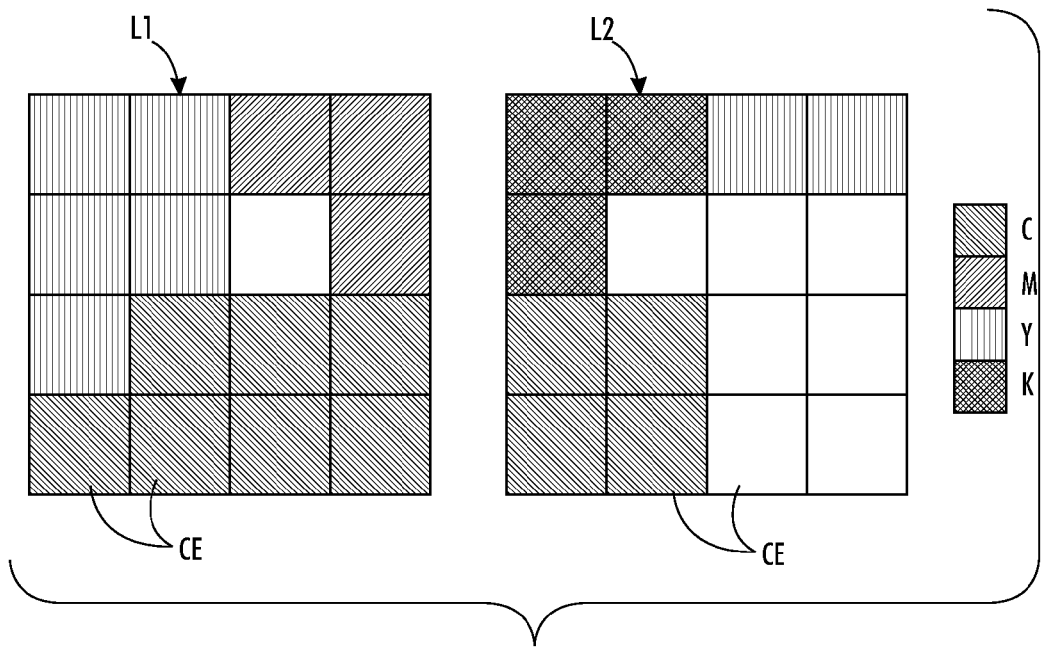
FIGS. 2A, 2B and 2C show the generation of various double layer masks according to the present development.
Figure 2B:
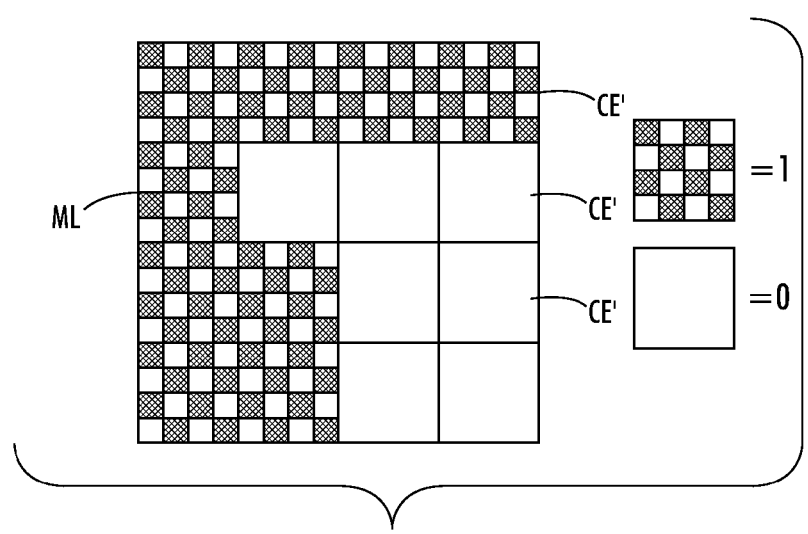
Figure 2C:
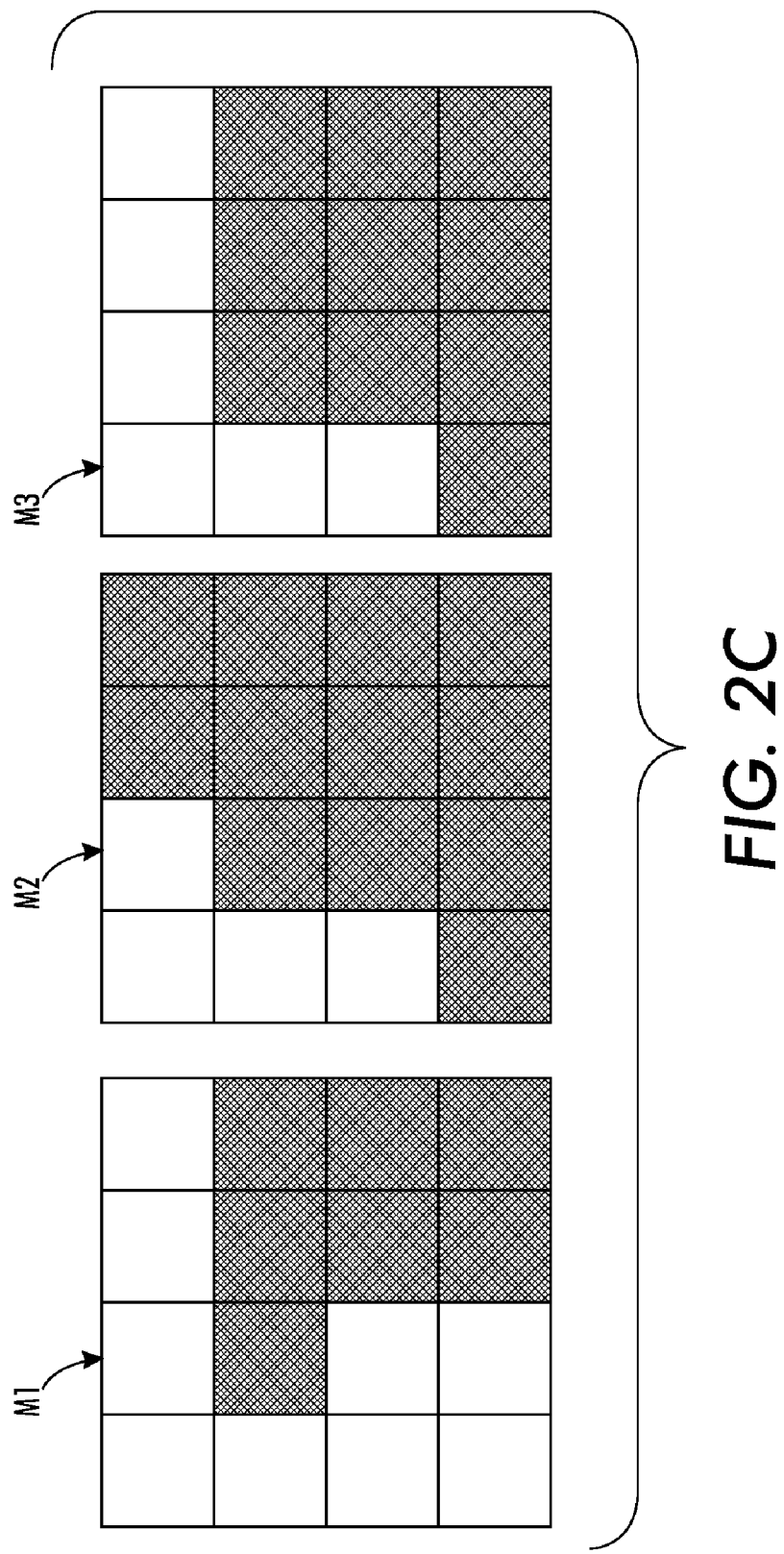

FIGS. 2A, 2B and 2C show exemplary derivations of the double layer mask used in S2 of FIG. 2. FIG. 2A shows that the metameric pair L1 and L2 comprises two cells each including 16 cell elements CE that are either colorant-free (shown as white space) or filled with a colorant selected from cyan (C), magenta (M), yellow (Y), or black (K) (shown with shading), wherein the cells L1,L2 provide an approximate metameric match under common visible light illumination, while having a clear difference in the overall colorant coverage, with L1 being UV-dull (only exposing 1/16 of the paper (1 of 16 cell elements CE)) and L2 being UV-active (exposing 7/16 of the paper (7 of 16 cell elements)). It is understood that L1 and L2 in FIG. 2A are idealized graphics for explanation only and that real metameric pairs will in general use larger cells and the metameric match is also in general not a simple linear combination of the various colorants due to unwanted absorptions and other higher order effects.

As shown in FIG. 2B, the step S2 comprises a sub-step in which correspondingly located cell elements CE of the cells L1 and L2 are logically combined creating a map ML that identifies all cell elements that are colorant-free in at least one of the cells L1,L2. Stated another way, the map ML shows which cell elements CE include at least one colorant in both cells L1,L2. As such, the map ML is defined by cell elements CE' that are located to correspond with the cell elements CE of cells L1 and L2, wherein:

CE'=1 (shown by checkerboard pattern) if both L1 and L2 include colorant for the cell element location;

CE'=0 (shown by white space) if either L1 or L2 is colorant-free for the cell element location.

As shown in FIG. 2C, the step S2 comprises a further sub-step in which the preferred double layer mask M1 is created by protecting all cell elements CE that expose paper in at least one of the two cells L1 and L2 (protected cells are shown by black fill in FIG. 2C). The mask M1 is the preferred double layer mask because it completely protects the UV signal of L1 and L2 by protecting all cell elements CE that are colorant-free in either cell L1,L2, while simultaneously allowing the largest possible modification of the visible signal, i.e.: the unprotected area (shown as white space in FIG. 2C) is maximized. It is understood, that other alternative double layer masks might be used, as shown for example at M2 or M3 which can be derived based on additional design parameters, such as the desire to also protect a certain colorant to maintain a coarse coloration of the resultant combination. It is also understood and explicitly included that one might create a double layer mask that only protects a certain fraction of the protected area of double layer mask M1. All those masks would reduce the strength of the actual UV signal, i.e.: the difference in UV response of L1 and L2, and are thus generally less preferred.

Figure 3A:
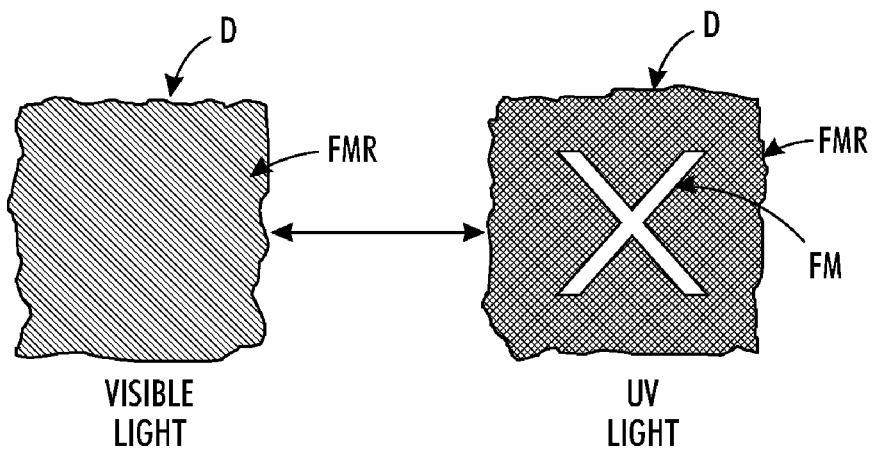
FIG. 3A (prior art) illustrates a portion of a printed document including a fluorescence mark region as viewed in visible light (VIS) and UV light (UV)

FIG. 3A (prior art) illustrates a portion of a printed document D printed on paper or another substrate and including a conventional fluorescence mark region FMR as viewed in visible light and UV light. It can be seen that in visible light, the fluorescence mark region FMR appears as a homogenous colored region without any visible variable data. In UV light, however, the fluorescence mark FM (shown as the letter "X") becomes visible where the paper or other substrate includes less colorant coverage and increased substrate fluorescence. Alternatively, the fluorescence mark can be defined by an area where the substrate fluorescence is suppressed compared to a surrounding area.

Figure 3B:
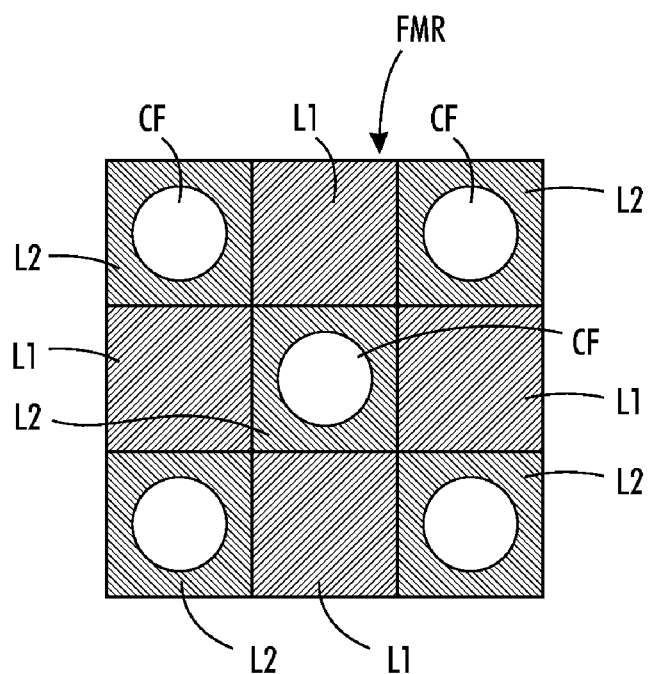
FIG. 3B (prior art) is a greatly enlarged view of the fluorescence mark region of the printed document of FIG. 3A showing the metameric colorant pairs applied to different regions or cells.

FIG. 3B is a greatly enlarged and simplified view of the conventional fluorescence mark region FMR. It can be seen that the "X" fluorescence mark FM is defined by a matrix of multiple areas or cells L1,L2, which can be halftone cells or other discrete areas. For simplicity of description, the cells L1 are defined to be represented by colorant mixture A so as to be filled with colorant without colorant-free areas. Other cells L2 are defined to be represented by colorant mixture B so as to include at least one colorant free area CF. Those of ordinary skill in the art will recognize that the arrangement of the cells L1,L2 relative to each other will define the fluorescence mark FM, while the average color and luminance of the fluorescence mark region FMR in visible light will be uniform. They will also recognize that L1 does not have to exhibit a complete colorant coverage, as long as L1 and L2 have a distinct colorant coverage as previously shown in FIG. 2A.

Figure 4A:
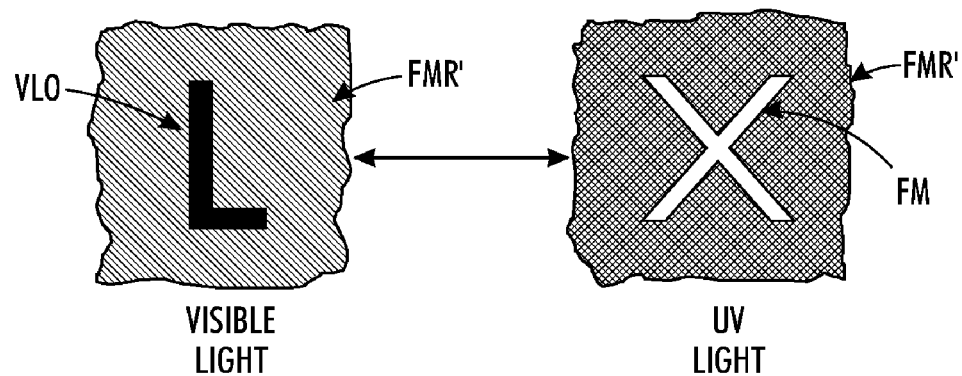
FIG. 4A illustrates a portion of a printed document including a fluorescence mark region with visible light variable data as viewed in visible light (VIS) and UV light (UV)

FIG. 4A corresponds to FIG. 3A, but shows a portion of a document D' including a double layer variable data fluorescence mark region FMR' according to the present development. The double layer fluorescence mark region FMR' is based upon the conventional fluorescence mark region FMR described above, but further includes at least one visible light variable object VLO (shown as the letter "L") defined by visible light variable data and that is visible to a human observer when the double layer variable data fluorescence mark region FMR' is viewed in visible light. When the double layer fluorescence mark region FMR' is viewed in UV light, as is also shown in FIG. 4A, the "X" shaped fluorescence mark FM is revealed as described above due to variations in suppression of substrate fluorescence in background region AP as compared to the foreground region BP, and the visible light variable object VLO at least substantially disappears as its color in UV light substantially matches the color of the background region AP.

Figure 4B:
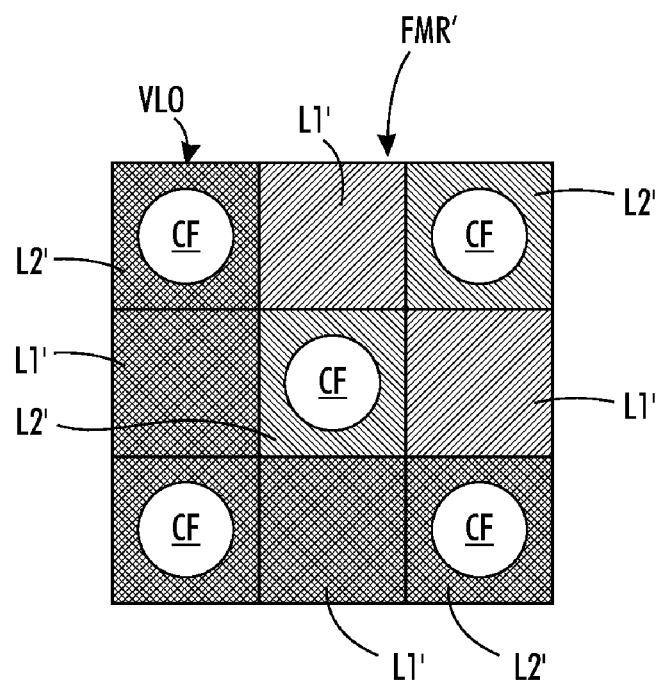
FIG. 4B is a greatly enlarged view of the fluorescence mark region of the printed document of FIG. 4A showing the metameric colorant pairs applied to different regions or cells, and showing a colorant mixture for the visible light variable data applied to different regions or cells.

FIG. 4B is a greatly enlarged and simplified view that is similar to FIG. 3B but shows the double layer fluorescence mark region FMR' defined by a matrix of multiple areas or cells L1',L2', which can be halftone cells or other discrete areas. The visible light object VLO is written into the fluorescence mark region FMR without adding any colorant to the colorant free areas CF. The visible light object VLO is defined by a colorant mixture C that is located only where the colorant mixture A or the colorant mixture B was already present in the basic fluorescence mark region FMR. As such, the visible light appearance of the double layer fluorescence mark region FMR' will be different from the basic fluorescence mark region FMR, but the UV light appearance of the double layer fluorescence mark region FMR' will be the same or at least sufficiently similar to the basic fluorescence mark region FMR to allow the fluorescence mark FM (here the letter "X") to be perceived. The colorant mixture C can be a single colorant (e.g., black (K)) or a mixture of colorants. In any case, the colorant mixture C is selected such that the visible light object VLO will exhibit an average color and luminance that is different from documents regions colored with either the colorant mixture A or the colorant mixture B in visible light, but such that the visible light object VLO will have an average color and luminance in UV light that is similar to document regions colored with the colorant mixture A in UV light, i.e., document regions colored with colorant mixture A and colorant mixture C will both be darker than document regions colored with colorant mixture B when the document D is viewed in UV light so that the fluorescence mark FM can be perceived.

Reconsidering the idealized double layer UV mark using three color C1, C2, C3 discussed above, we can see that we thusly derived an approximate four color set. Using the nomenclature of FIG. 4B, we get L1(visible light)≈L2(visible light)≠L1'(visible light)
L1(visible light)≈L2(visible light)≠L2'(visible light)
L1(UV light)≈L1' (UV light)≠L2(UV light)≈L2' (UV light)

where no explicit statement is made about the relationship between L1' and L2' in visible light, however, it is desirable that both L1' and L2' are either brighter or darker than L1 and L2 in visible light, thus giving the appearance of bright/dark text on a single color background. It is understood that the approximate symbol "≈" has to be read as an approximate metameric match in the context of the application scenario. The allowed deviation from an exact "=" metameric match in the context of UV security marks is much larger than the requirements usually imposed on matches for high quality imaging applications. The term "metameric pair" as used herein is intended to encompass colorant mixture pairings that provide an exact metameric result and also colorant mixture pairings that provide an approximate metameric result sufficient to allow for fluorescence mark encoding as described in connection with FIG. 1.

It is well understood that the colorant mixture C can be implemented by defining a spatial distribution as said colorant mixture, or can alternatively be implemented by separating it into two structures, one embedding the spatial structure into a double layer mask and the other structure representing the color without regard for the underlying protected cell areas. In general, the second approach is preferred if multiple different VLO colors are desired over the same underlying colorant mixtures A and B.

Figure 4C:
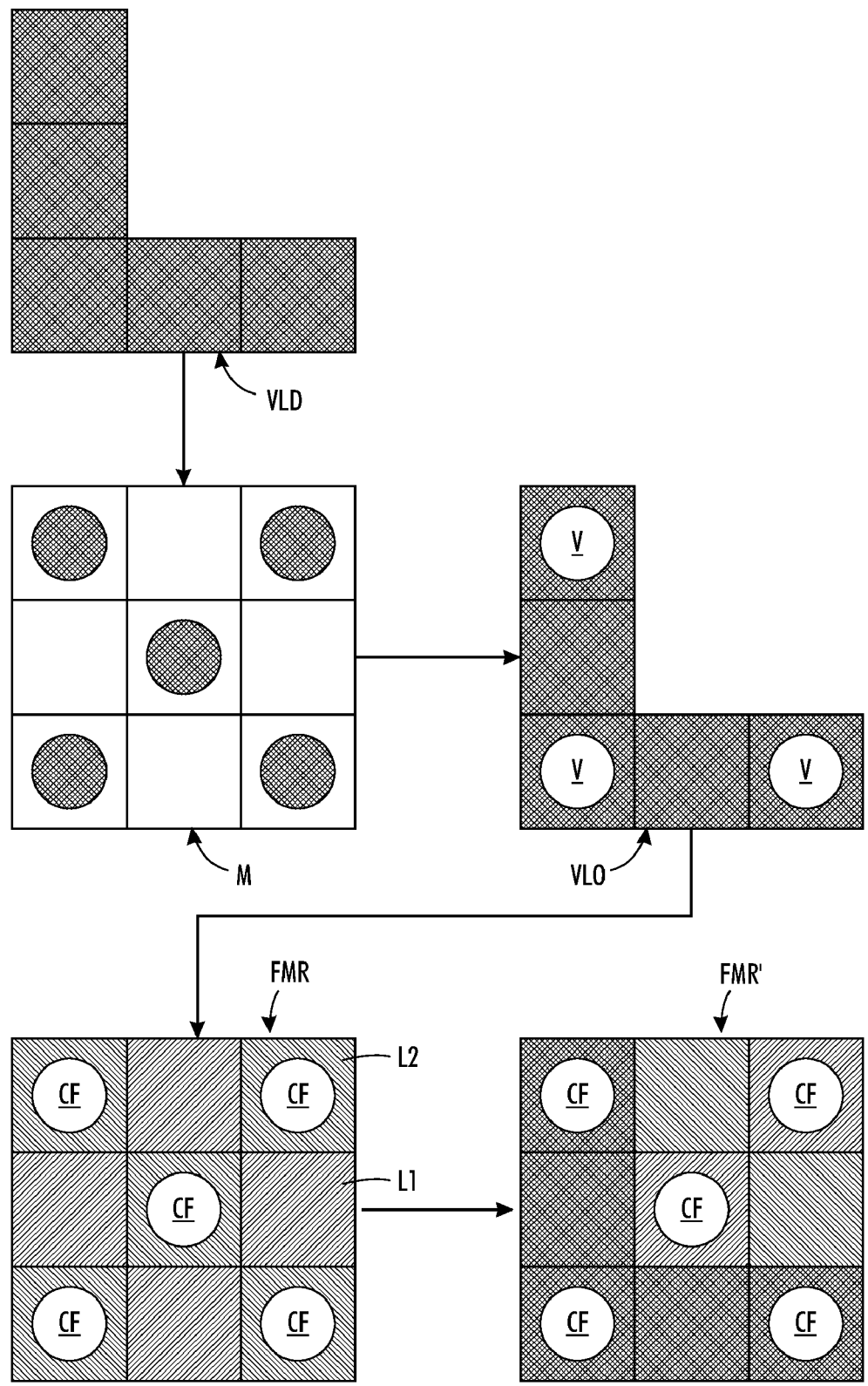
FIG. 4C diagrammatically shows writing of visible light variable data to a fluorescence mark region through a mask.

FIG. 4C shows that the desired visible light variable data VLD (in this case the character "L") to be written to the conventional fluorescence mark region FMR. According to the method as set forth in FIG. 2A, a double layer mask M is derived. The double layer mask is set to "off" (shown as solid black) for all areas of the fluorescence mark region FMR including or corresponding to a colorant free area CF. The double layer mask M is set to "on" (shown as solid white) for all other areas of the fluorescence mark region FMR, i.e., for all areas in the fluorescence mark region that are covered with colorant from the colorant mixture A or the colorant mixture B. As such, the double layer mask M permits writing of visible light variable data VLD to the fluorescence mark region FMR only in locations where the mask is set to "on" and blocks writing of any visible light variable data to the fluorescence mark region FMR where the mask is set to "off." As shown in FIG. 4C, writing the visible light variable data VLD through the mask M defines the visible light variable object VLO which includes colorant free areas or voids V. The visible light object VLO is written to the conventional fluorescence mark region FMR to define the double layer fluorescence mark region FMR'. The voids V remain colorant free in a resulting printed document D' and correspond in location to and at least encompass the correspondingly located colorant free areas CF of the conventional fluorescence mark region FMR so that the visible light object VLO does not alter the colorant free areas CF of the basic underlying fluorescence mark FM which can still be perceived in UV light, but the visible light object VLO is still sufficiently defined so as to be readily perceived by a human observer in visible light.

Figure 5:
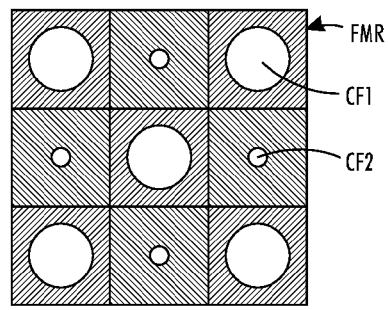
FIG. 5 (prior art) is another example of a known fluorescence mark region defined by metameric colorant pairs applied to various regions or cells.
Figure 5A:
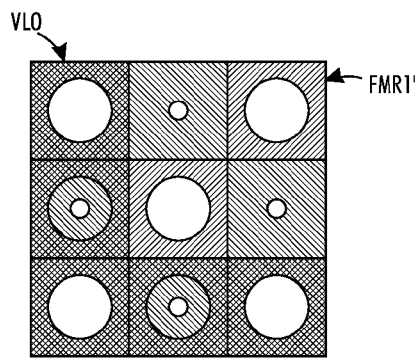
FIG. 5A illustrates a "single mask" method for including a colorant mixture to define the visible light variable data to the fluorescence mark region of FIG. 5.

In many cases, limited data availability and/or speed constraints require that the "off" locations of the mask all be set to a worst case size such that the "off" location of the mask M will encompass the largest expected colorant free area CF. It is easy to see that this "worst" case for the visible illumination is identical to the preferred case for a single mask under UV illumination. Understanding that the UV signal in general will be weaker than the visible signal, the preferred implementation will optimize with respect to the UV signal. As shown in FIG. 5, it is possible that a conventional fluorescence mark region FMR will include relatively larger colorant free areas CF1 and relatively smaller colorant free areas CF2. In such case, if the "off" locations of the mask M are set to a worst case size such that the "off" location of the mask M encompass the largest expected colorant free area CF the method will result in the fluorescence mark region FMR1' of FIG. 5A, wherein the voids V of the resulting visible light object VLO are partially colored by colorant mixture A or colorant mixture B from the underlying fluorescence mark region FMR. This is generally acceptable for security mark applications and does not meaningfully detract from the appearance of the visible light object.

In some cases, it is possible to for the double layer mask M to be adapted for the larger and smaller colorant free areas CF1,CF2, in which case the "off" areas of the mask will correspond in size to the corresponding colorant free area CF1,CF2 of the basic or underlying fluorescence mark. These cases use two different double layer masks, one for each colorant combination A and B. Such a mask can be referred to as an adaptive double layer mask. In such case, colorant mixture C defining the visible light object VLO is used to replace of all the correspondingly located underlying metameric colorant mixtures A,B of the underlying fluorescence mark region FMR, and the voids V in the visible light object VLO are sized to match their respective correspondingly located colorant-free areas CF1,CF2 of the underlying fluorescence mark FMR.

Figure 5B:
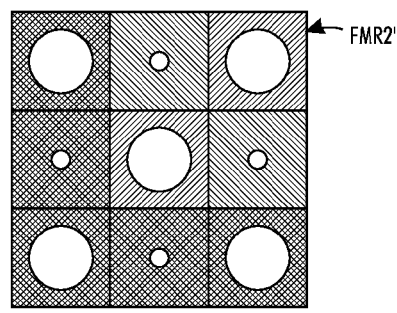
FIG. 5B illustrates a "double mask" method for including a colorant mixture to define the visible light variable data to the fluorescence mark region of FIG. 5.

It is clear that the scenario of FIG. 5B requires a communication between UV signal and visible signal to correctly select the adaptive mask and that in many printing systems this communication is impossible or at least cumbersome. In those systems the single double layer mask described earlier is the preferred method.

Figure 6:
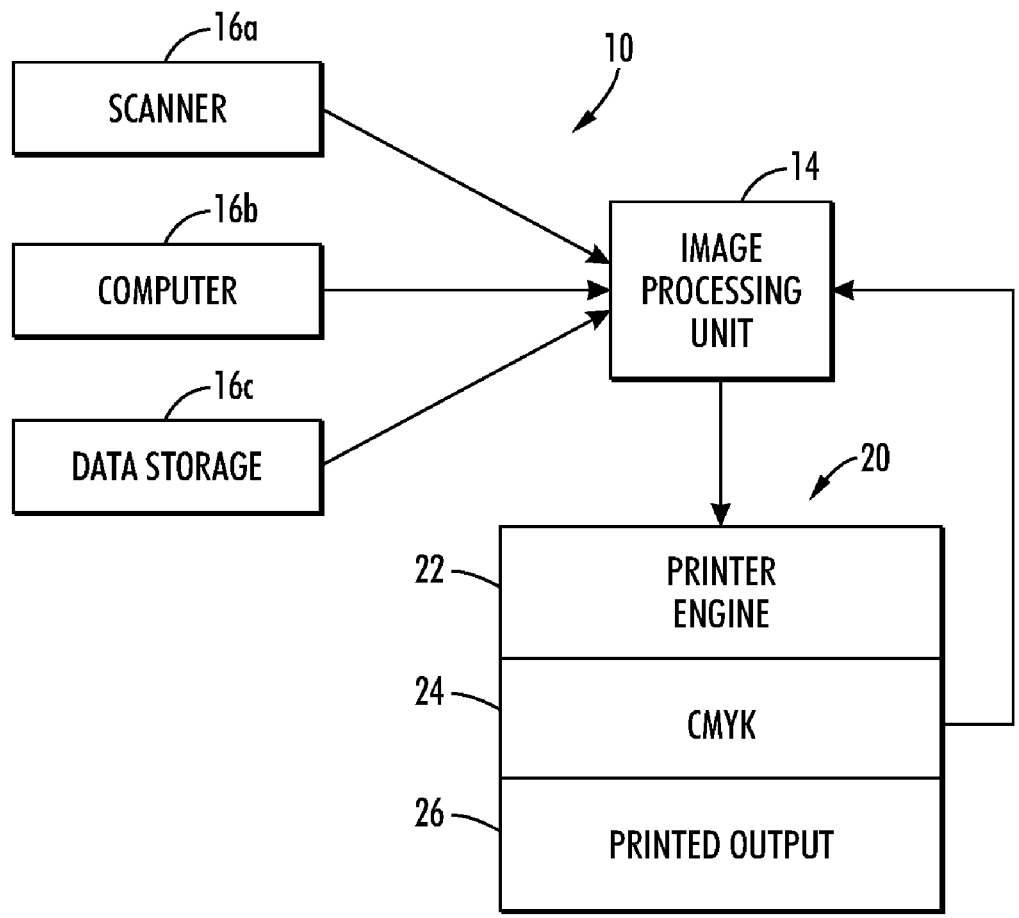
FIG. 6 shows one example of a system for implementing a method in accordance with the present development.

The system and method in accordance with the present development are preferably implemented in a printing system such as any commercially available multi-colorant ("color") printer, which can be provided as part of a printing and/or reproduction apparatus. Typically, the printer implements a CMYK color space and includes a xerographic printer engine although the present development is applicable to other printing methods such as ink-jet. FIG. 6 illustrates one example of an apparatus for implementing a method in accordance with the present development. The apparatus 10 comprises an image processing unit (IPU) 14 for carrying out the digital image processing operations disclosed herein. The IPU 14 is defined by electronic circuitry and/or software that is dedicated to digital image processing and/or can comprise a general purpose computer programmed to implement the image processing operations disclosed herein. The IPU 14 is adapted to receive image data from a source such as a scanner 16a, computer 16b (e.g., a digital front-end (DFE)), and/or data storage 16c or another source that is part of the apparatus 10 and/or that is operably connected to the IPU 14 through a network or other means. For example, in one embodiment, the IPU 14 receives data defining the size, shape, color and location of the double layer fluorescence mark region FMR', including data defining the colorant mixture A, the colorant mixture B, and the type, size, shape and color of the visible light variable data. The apparatus 10 comprises an image output or printing unit 20 including a xerographic, ink-jet, or other print engine 22 for printing the image data on paper or another recording medium that exhibits native fluorescence using toner and/or ink as is known in the art, using the CMYK or other multi-colorant color space 24. The printer unit 20 further comprises a printed output station 26 for physical output of the final printed product such as printed paper, transparencies or other recording media sheets. Examples of suitable commercially available systems 10 include, but are not limited to, the Phaser™, WorkCentre™, DocuColor™, iGenr™ and iGen4™ printing/copying digital press systems available from Xerox Corporation.

The claims, as originally presented and as they may be amended, encompass variations, alternatives, modifications, improvements, equivalents, and substantial equivalents of the embodiments and teachings disclosed herein, including those that are presently unforeseen or unappreciated, and that, for example, may arise from applicants/patentees and others.

The invention claimed is:

1. A method for including a double layer security mark in digital document data defining an image of a document to be printed, said method comprising:

defining a fluorescence mark region including a fluorescence mark in said digital document data, said fluorescence mark region defined by first colorant mixture data for defining a first colorant combination and second colorant mixture data defining a second colorant combination, wherein said first and second colorant combinations are a metameric pair that define respective first and second colors that are at least substantially indistinguishable in visible light and wherein said first colorant mixture data and said second colorant mixture data define colorant-free areas of said fluorescence mark region;

modifying said fluorescence mark region to define a double layer fluorescence mark region including said fluorescence mark and also including at least one visible light object defined by third colorant mixture data, wherein said third colorant mixture data defines a third color that varies in average color and luminance from both said first and second colors in visible light, wherein said step of modifying said fluorescence mark region includes: (i) writing said third colorant mixture data to said fluorescence mark region and protecting at least some of said colorant-free areas of said fluorescence mark region with a mask to prevent writing of said third colorant mixture data to said colorant-free areas that are protected by said mask; and, (ii) replacing at least some of said first and second colorant mixture data with said third colorant mixture data such that said fluorescence mark region includes said first, second, and third colors and said colorant-free area that are protected by said mask; and, printing a document on paper using said document data including said double layer fluorescence mark region, wherein said first, second and third colors defined respectively by said first, second, and third colorant mixture data are printed, said third color and one of said first and second colors being darker or lighter than the other of said first and second colors when said printed document is viewed in UV light.

2. The method as set forth in claim 1, wherein said mask includes "off" locations that at least encompass all of said colorant-free areas of said fluorescence mark region, wherein all other locations of said mask are "on" locations, wherein said "off" locations of said mask correspond to areas of said fluorescence mark region to be protected by said mask.

3. The method as set forth in claim 2, wherein said step of modifying said fluorescence mark region comprises writing said third colorant mixture data to said fluorescence mark region through said mask, wherein said "off" locations of said mask prevent writing of said third colorant mixture data to said correspondingly located colorant-free areas of said fluorescence mark region.

4. The method as set forth in claim 3, wherein all of said "off" mask locations have an equal spatial size that is at least as large as the largest colorant-free area of said fluorescence mark region.

5. The method as set forth in claim 3, wherein at least some of said "off" mask locations vary in spatial size relative to each other.

6. The method as set forth in claim 5, wherein said "off" mask locations match the spatial size of their respective correspondingly located colorant-free areas in said fluorescence mark region.

7. The method as set forth in claim 1, wherein said step of modifying said fluorescence mark region includes replacing said first and second colorant mixture data with said third colorant mixture data for all locations in said fluorescence mark region that include said at least one visible light object.

8. The method as set forth in claim 1, wherein said at least one visible light object defines text.

* * * * *